United States Patent [19]

Danzuka et al.

[11] Patent Number: 5,084,758
[45] Date of Patent: Jan. 28, 1992

[54] IMAGE PROCESSING APPARATUS WITH SIGNAL INDICATING TYPE OF LIGHT TO BE USED FOR OBSERVING REPRODUCED IMAGE

[75] Inventors: Toshimitsu Danzuka, Tokyo; Akio Suzuki, Yokohama; Yoshihiro Takada, Kawasaki; Masami Izumizaki, Tokyo, all of Japan

[73] Assignee: Canon Kabushiki Kaisha, Tokyo, Japan

[21] Appl. No.: 700,318

[22] Filed: May 9, 1991

Related U.S. Application Data

[63] Continuation-in-part of Ser. No. 381,797, Jul. 19, 1989, abandoned.

[30] Foreign Application Priority Data

Jul. 20, 1988 [JP] Japan .................. 63-182558

[51] Int. Cl.⁵ .................... H04N 1/46; B41J 2/21
[52] U.S. Cl. .................... 358/296; 358/80; 358/487; 346/1.1; 346/135.1; 346/140 R
[58] Field of Search .......... 358/296, 302, 75, 76, 358/80, 487; 346/140 R, 135.1; 250/559, 571

[56] References Cited

U.S. PATENT DOCUMENTS

| | | | |
|---|---|---|---|
| 4,269,891 | 5/1981 | Minagawa | 346/135.1 |
| 4,797,712 | 1/1989 | Hayashi | 358/76 |
| 4,851,923 | 7/1989 | Abe | 358/296 |
| 4,882,621 | 11/1989 | Suzuki et al. | 358/80 |
| 5,004,928 | 4/1991 | Suzuki et al. | 250/559 |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An image recording apparatus includes an input circuit for inputting an image signal; a correction circuit for correcting the inputted image signal; an image forming circuit for forming an image in accordance with the image signal corrected by the correction circuit; a switch for generating a signal indicating a method of observing the image formed by the image forming circuit; and a control circuit for controlling the correction circuit in accordance with the signal generated by the signal generating switch.

64 Claims, 4 Drawing Sheets

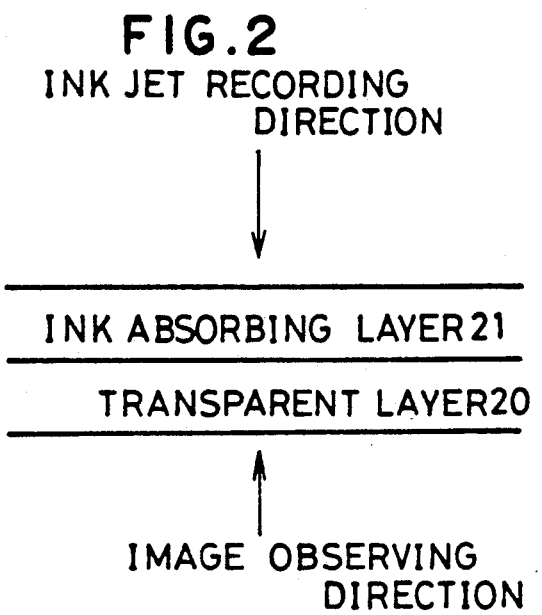
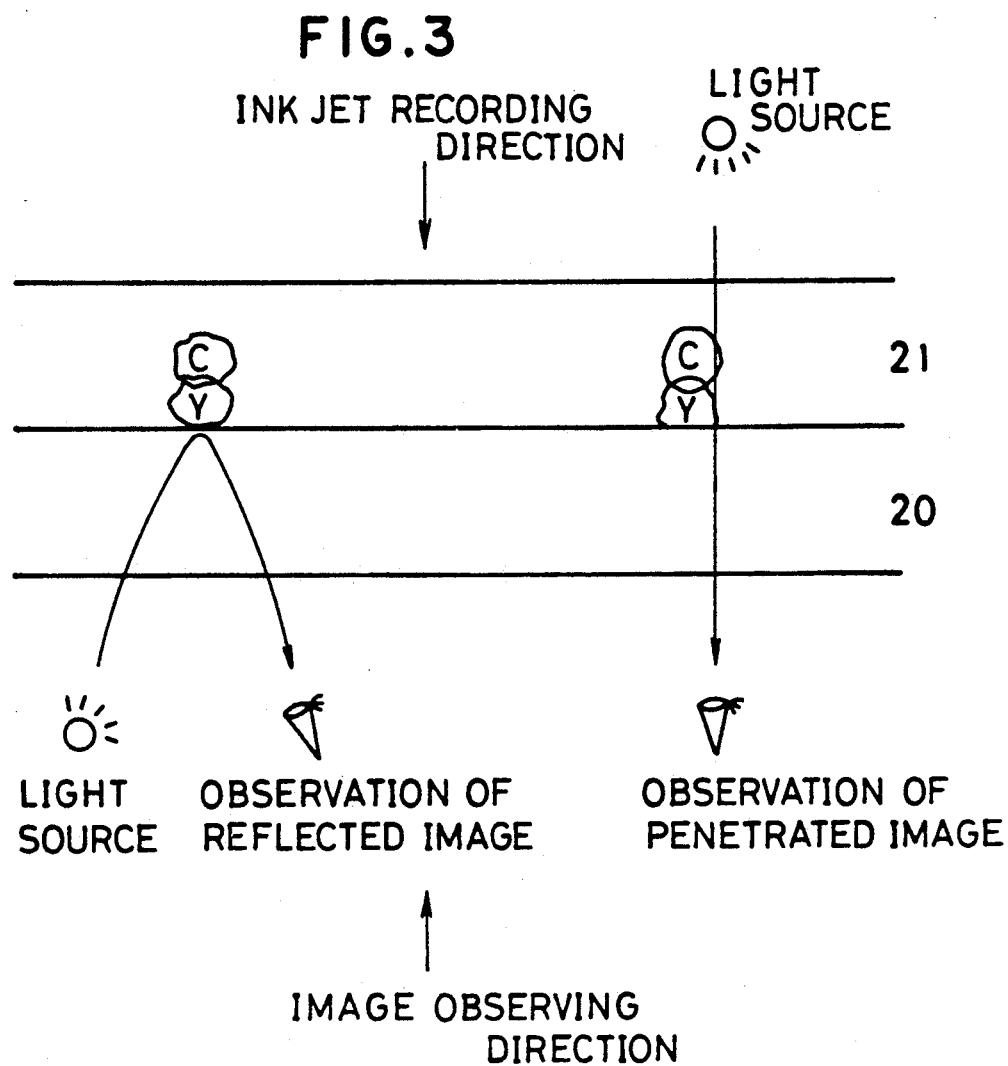

IMAGE PROCESSING APPARATUS WITH SIGNAL INDICATING TYPE OF LIGHT TO BE USED FOR OBSERVING REPRODUCED IMAGE

This application is a continuation-in-part of application Ser. No. 07/381,797 filed July 19, 1989, now abandoned.

BACKGROUND OF THE INVENTION

1. Field of the Invention

The present invention relates to an image processing apparatus, and more particularly to an image processing apparatus suitable for forming a color image.

2. Related Background Art

As the method for forming a color image on a recording medium such as paper, there is known a method of forming a color image by superposing different colors with ink jet recording, with thermal recording or the like.

If a light transmission film, for example, is used as a recording medium for ink jet recording, there arises the problem that the chromaticity and density of a transmitted color image as observed with transmitted light becomes different from those of a reflected color image as observed with reflected light. The main reason for this is as follows.

Most color ink jet recording apparatus are generally equipped each with four color heads, yellow (Y), magenta (M), cyan (C) and black (BK), and form a color mixture, e.g., green, by jetting out Y and C ink droplets at the same point. The order of jetting out a plurality of colors to form a color mixture has a great effect upon the chromaticity of a reflected color image on a light transmission film. Specifically if Y and C ink droplets are jetted out in this order as shown in FIG. 3, Y ink is absorbed in the film medium at the position nearer to the observation site for a reflected color image, whereas C ink is absorbed at the far position from the observation site. Since Y ink has a greater effect than C ink, the observed reflected color image has a chromaticity of green nearer to Y. In FIG. 3, reference numeral 21 represents an ink absorbing layer of a recording medium, and 20 represents a light transmission film layer which does not absorb ink but is transparent relative to light.

On the contrary, in case of a transmitted color image as observed with transmitted light, the order of jetting out ink droplets has substantially no adverse effects. Therefore, the chromaticity of green of the transmitted color image can be observed nearer to C when compared to the reflected image.

As described above, the chromaticity of a transmitted color image as observed with transmitted light from the back of the film becomes different from that of a reflected color image as observed with reflected light from the film, resulting in image quality deterioration.

SUMMARY OF THE INVENTION

In view of the above problems it is therefore an object of the present invention to provide an image recording apparatus capable of having a good chromaticity of an image even if it is observed in different ways.

It is another object of the present invention to provide a color image recording apparatus as above capable of obtaining a good color reproduction of a color image formed on a recording medium when observed with transmitted light as well as with reflected light.

According to a preferred embodiment achieving the above objects, the image recording apparatus comprises input means for inputting an image signal; correction means for correcting said inputted image signal; image forming means for forming an image in accordance with said image signal corrected by said correction means; means for generating a signal indicating a method of observing said image formed by said image forming means; and control means for controlling said correction means in accordance with said signal generated by said signal generating means.

It is a further object of the present invention to provide an image recording apparatus capable of obtaining a good color reproduction of a color image formed on a recording medium when observed with applied light, irrespective of the light emission characteristic of light emitting means.

The above and other objects, and advantages of the present invention will become apparent from the following detailed description when read in conjunction with the accompanying drawings.

BRIEF DESCRIPTION OF THE DRAWINGS

FIG. 2 is a cross sectional view of an embodiment of an ink jet recording medium usable as a back-light type display;

FIG. 3 illustrates the difference of chromaticity of an image on the recording medium shown in FIG. 2 as observed with transmitted light from the image and as observed with reflected light;

DETAILED DESCRIPTION OF THE PREFERRED EMBODIMENTS

In the following embodiments, an apparatus is disclosed which performs ink jet recording and uses a recording medium as shown in FIG. 2 as well as an ordinary paper sheet and an ink jet recording sheet (e.g., coat sheet). The recording sheet shown in FIG. 2 has a transparent base film 20 and a porous ink absorbing white sheet 21 on the film 20 so that an image formed on the sheet can be observed either with transmitted light or with reflected light. The invention however is not limited to such recording medium, but other recording media observed with transmitted light can be used, such as an over-head projector film made of only a transparent film on which an image is formed with thermal transfer recording.

The recording medium shown in FIG. 2 has the advantage that it can obtain a glossy and high quality image because a recorded image can be observed from the side of the transparent base film 20 opposite to the side of the porous ink absorbing white layer 21. The recording medium also has the advantage that it can be used as a back-light display such that light is applied from the ink absorbing white layer and the transmitted light is observed from the side of the transparent base film.

The embodiments of this invention will be described in detail with reference to the accompanying drawings.

Figure 1:
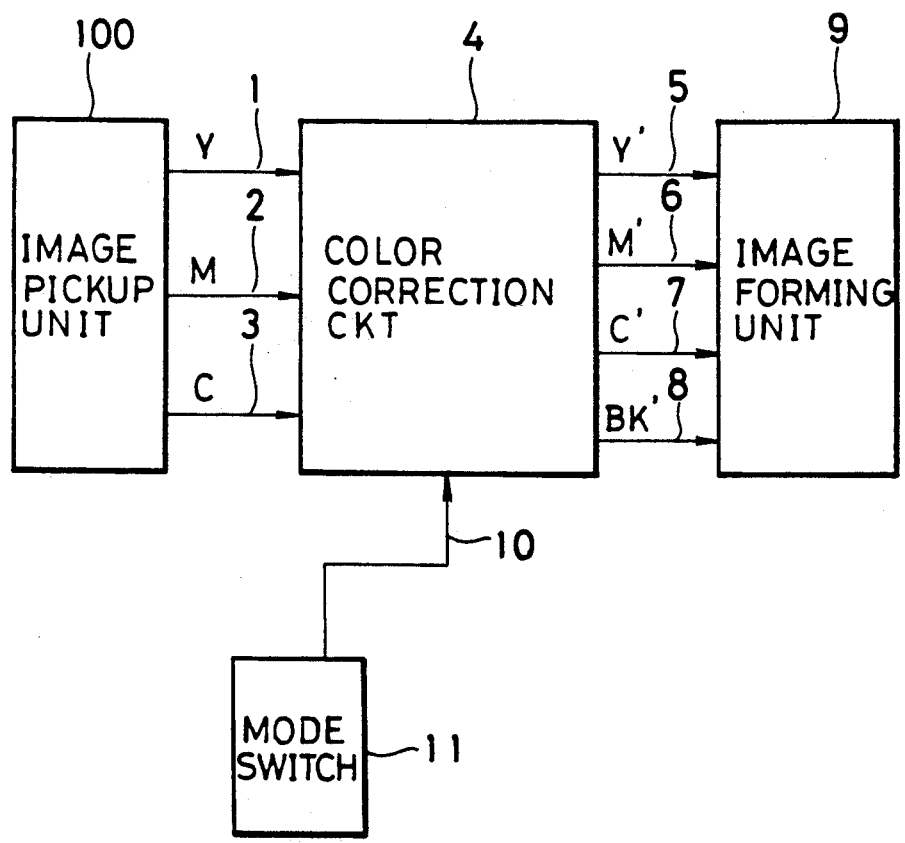
FIG. 1 is a block diagram showing the structure of a color ink jet printer embodying the present invention.

Description of Structure of Color Ink Jet Printer (FIG. 1)

FIG. 1 shows the structure of an embodiment of the color ink jet printer according to the present invention.

In FIG. 1, reference numerals 1 to 3 denote digital color image signals representative of the densities of yellow (Y), magenta (M) and cyan (C), respectively. These digital color image signals are outputted from a device such as an image pickup unit 100.

Reference numeral 4 represents a color correction circuit which is a known color correction circuit including a masking circuit, UCR circuit, gamma correction circuit or the like. The color correction parameters such as masking coefficients, UCR coefficients, gamma values or the like are arranged to be changed in accordance with a color correction parameter change signal 10. Y, M and C signals are color corrected to Y', M', C' and BK' signals 5 to 8. An image forming unit 9 forms an image by a color ink jet method for example. A mode switch 11 outputs the color correction parameter change signal 10 for changing color correction parameters to be used by the color correction circuit 4 in accordance with the method of observing an image to be formed by the image forming unit on a recording medium.

Description of Recording Medium (FIG. 2)

FIG. 2 is a cross sectional view showing an example of a recording medium used by the apparatus of this embodiment.

In FIG. 2, reference numeral 20 represents a transparent layer serving as a base material, and reference numeral 21 represents a porous ink absorbing white layer 21. This recording medium has the advantages that an image of glossy and very high quality recorded as a mirror image on the ink absorbing layer 21 can be obtained when it is observed from the transparent layer 20 side, and that weatherability is efficient because of the coverage of an image surface with the transparent layer 20. In addition, the recording medium a sufficiently large transmission of light upon application of light from the back so that it can be used as a back-light display.

Figure 4:
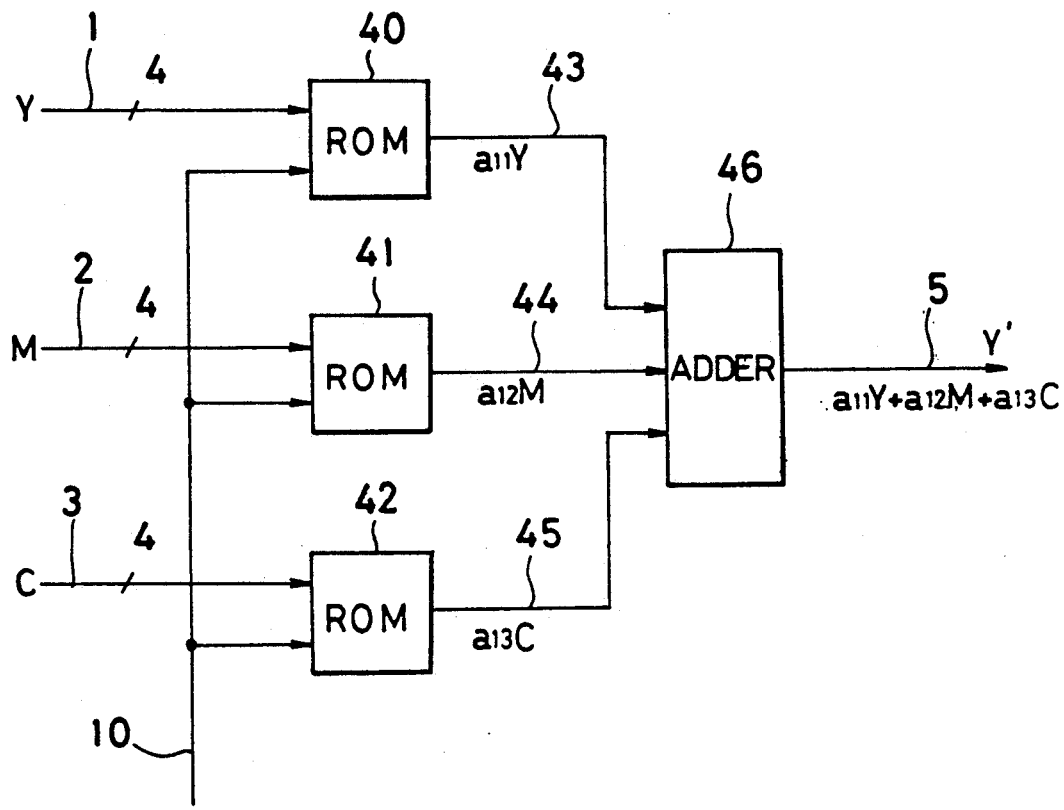
FIG. 4 shows an example of a yellow signal conversion unit in the color correction circuit 4 shown in FIG. 1.

Description of Color Correction Circuit (FIG. 4)

FIG. 4 is a block diagram showing an example of a circuit portion of the color correction circuit 4, particularly illustrating the Y signal conversion circuit. For example, when three input signals Y, M and C to the color correction circuit 4 are subjected to color correction by masking processing to obtain output signals Y', M' and C':

$$Y' = a_{11}Y + a_{12}M + a_{13}C$$

$$M' = a_{21}Y + a_{22}M + a_{23}C$$

$$C' = a_{31}Y + a_{32}M + a_{33}C$$

the coefficients $a_{11}$ to $a_{33}$ are changed in response to the color correction parameter change signal 10.

In FIG. 4, reference numerals 1 to 3 represent input image information, e.g., 8 bit Y, M and C color signals. Reference numeral 10 represents the color correction parameter change signals, 40 to 42 represent a coefficient multiplication ROM, and 43 to 45 represent an 8 bit multiplication result signal. Reference numeral 46 represents an adder which adds together the signals 43 to 45 to output therefrom a masked signal:

$$Y' = a_{11}Y + a_{12}M + a_{13}C$$

An 8 bit Y signal 1 is supplied to the coefficient multiplication ROM 40 as the address A representative of lower 8 bits, and the one bit color correction parameter change signal 10 is supplied to ROM 40 as the address representative of the ninth bit from the lowest bit. ROM 40 stores the value of $a_{11}A$ at the address A representative of the lower 8 bits. In this color correction, two correction values are selectively obtained in accordance with the value of the change signal 10 at the ninth bit. Namely, if the signal 10 is "0", $a_{11}Y$ is outputted, whereas if "1", $a_{11}'Y$ is outputted. In the similar manner, ROM 41 performs a multiplication operation for magenta signal, and ROM 42 for cyan signal.

Consequently, if the color correction parameter change signal 10 is "0", the output from the adder 46 becomes $Y' = a_{11}Y + a_{12}M + a_{13}C$, and if "1", the output becomes $Y' = a_{11}'Y + a_{12}'M + a_{13}'C$.

The similar circuits for magenta and cyan signals are provided so that color correction is executed to have the following results in accordance with the value of the color correction parameter change signal:

$$Y' = a_{11}Y + a_{12}M + a_{13}C$$

$$M' = a_{21}Y + a_{22}M + a_{23}C$$

$$C' = a_{31}Y + a_{32}M + a_{33}C$$

and $$Y' = a_{11}'Y + a_{12}'M + a_{13}'C$$

$$M' = a_{21}'Y + a_{22}'M + a_{23}'C$$

$$C' = a_{31}'Y + a_{32}'M + a_{33}'C$$

For example, the coefficients $a_{11}$ to $a_{33}$ are selected such that a color difference between an original image and an observed image becomes minimum for the case where the image is observed with reflected light from the image as in an ordinary case. On the other hand, the coefficients $a_{11}'$ to $a_{33}'$ are selected such that a color difference becomes minimum for the case where the image is observed with transmitted light as applied from the back of the image.

By selecting the masking coefficients as above, it is possible to always retain a good color reproduction. Such selection is also dependent upon the transmission characteristic of ink and upon the order of superposing ink droplets one upon another.

Figure 6:
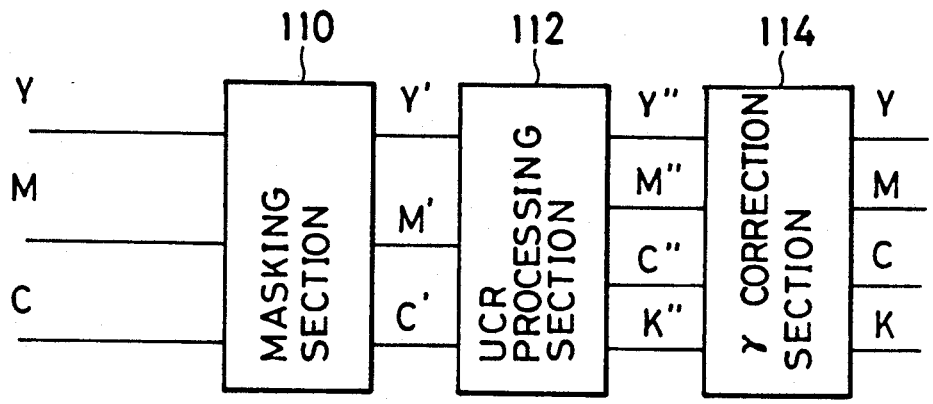
FIG. 6 is a block diagram showing the main structure of the color correction circuit 4.

FIG. 6 shows the structure of the color correction circuit shown in FIG. 4. In FIG. 6, reference numeral 110 represents the color masking section similar to the circuit shown in FIG. 4, 112 a UCR processing section for UCR processing the color masked data, and 114 a gamma correction section for gamma correcting the UCR processed data in accordance with the image forming characteristic of the image forming unit 9.

The color correction means of this invention s not limited to the above-described masking processing, but other color correction processing may be used. For example, the UCR processing executed by the UCR processing section 112 shown in FIG. 6 may be used which performs a following operation:

$$BK' = b_1 \times min(Y, M, C)$$

$$Y' = Y - b_2 \times min(Y,M,C)$$

$$M' = M - b_3 \times min(Y,M,C)$$

$$C' = C - b_{4i} \times min(Y,M,C)$$

or the gamma correction processing executed by the gamma correction section 114 shown in FIG. 6 may be used which performs a following operation:

$$Y' = \gamma 1 \times Y$$

$$M' = \gamma 2 \times M$$

$$C' = \gamma 3 \times C$$

The coefficients B1 to B4 and $\gamma 1$ to $\gamma 3$ are changed during the color correction processing to thereby obtain the similar advantages described above.

Such various correction processing may be performed using a ROM table shown in FIG. 4, or using a subtracter or minimum value detection circuit instead the multiplier.

Figure 5:
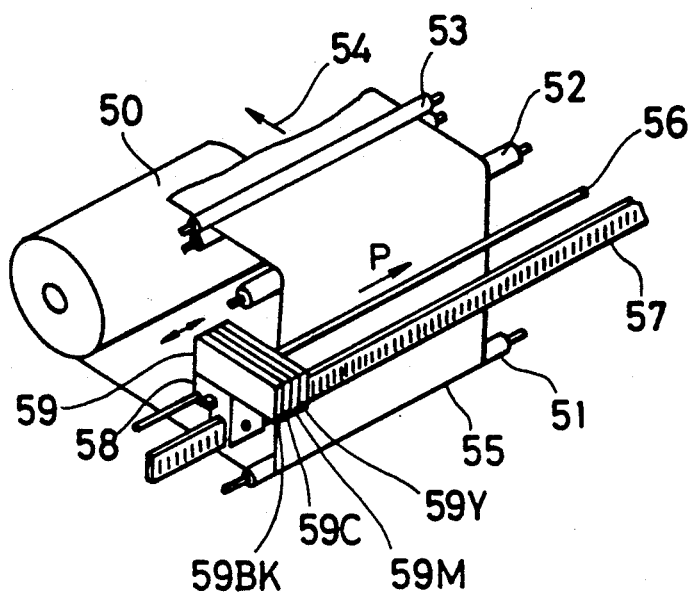
FIG. 5 is a perspective view showing the image forming unit of a color ink jet printer unit.

Description of Image Forming Unit (FIG. 5)

FIG. 5 is a perspective view showing an embodiment of the image forming unit 9 shown in FIG. 1 which mounts thereon an ink jet recording head of a drop-on-demand type.

Referring to FIG. 5, a rolled recording medium 50 is fed via transport rollers 51 and 52 with feed rollers 53 in the direction indicated at 54. Guide rails 56 and 57 are disposed in parallel transversing the recording medium 55 so that a recording head unit 59 supported on a carriage 58 can be scanned to the right and left along the guide rails 56 and 57. Mounted on the carriage 58 are four heads 59Y, 59M, 59C and 59BK of yellow, magenta, cyan and black colors, four color ink tanks being provided to the respective heads. The recording medium 55 is intermittently fed in units of a print width of the recording head 59, whereas the recording head 59 is scanned, during a stop of the recording medium 55, in the direction indicated at P to jet out ink droplets in accordance with image signals.

Another embodiment of the color correction circuit 4 will be described.

The chromaticity of an image observed with transmitted light as applied from the back of the image differs depending upon the type of back-light. For example, the color tone of an image observed with an ordinary fluorescent lamp differs from that observed with a more or less colored candescent lamp. To deal with this problem, for example, the capacity of ROMs 40 to 42 shown in FIG. 4 is increased to increase the number of bits of the color correction parameter change signal 10. With this arrangement, it becomes possible to prepare as many color correction parameters as the number of various light source types, to thereby always retain a good color reproduction for each of the light sources.

Figure 7:
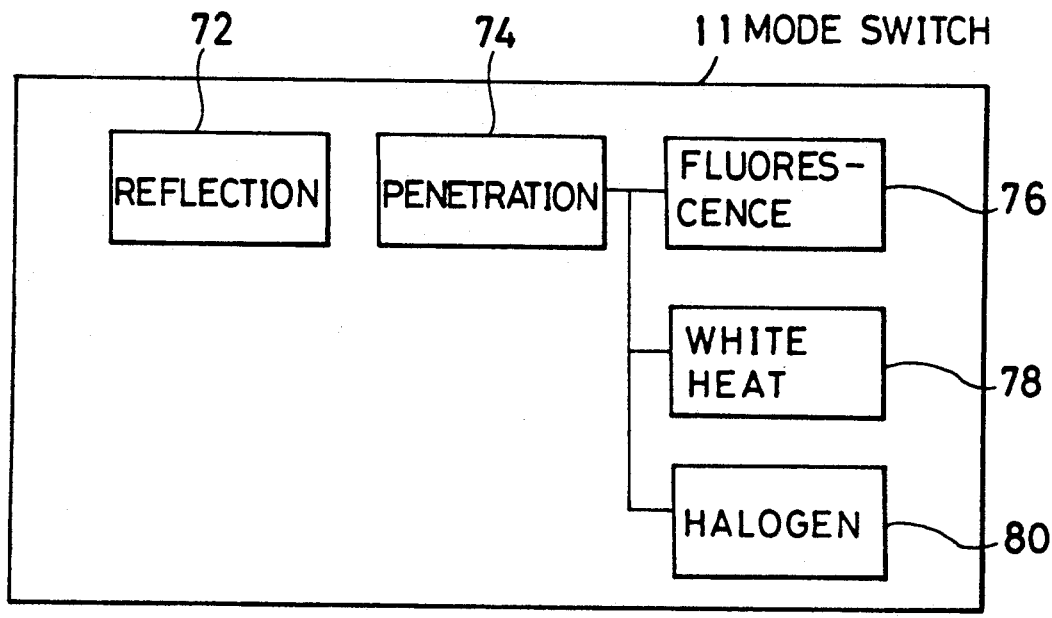
FIG. 7 is a plan view showing the structure of the mode switch 11 shown in FIG. 1.

FIG. 7 shows an example of structure of the mode switch 11 for effecting such parameter selection.

Referring to FIG. 7, reference numerals 72 to 80 represent switches constituting the mode switch 11. Reference numeral 72 represents a switch for indicating that an image is to be observed with reflected light, and 74 a switch for indicating that an image is to be observed with transmitted light. Reference numerals 76, 78 and 80 represent respectively a fluorescent lamp, candescent lamp, and halogen lamp switch for designating the type of light source by which an image is observed with transmitted light. The color correction coefficients in the color correction circuit 4 shown in FIG. 1 are set slightly different for each switch shown in FIG. 7. Namely, the correction coefficients are set such that a reddish color is emphasized for a fluorescent lamp, and a bluish color is emphasized for a candescent lamp, and so on.

As described so far, according to the present embodiments, a color image can be recorded on a recording medium which allows observation of the image at high quality either with transmitted light as applied from the back of the image or with reflected light as ordinary, thereby readily obtaining both an image usable as a back-light type display and an image of high grade suitable for ordinary observation.

In the above embodiments, the color correction parameters have been selectively used in recording an image on the recording medium shown in FIG. 2, depending upon a method of observing the image. However, the invention is not limited thereto, but the color correction parameters may also be selectively used either in recording an image on an over-head projecting film or in recording an image on an ordinary paper sheet observed with reflected light.

As appreciated from the foregoing description of the embodiments, an image of high quality can be obtained either for an image observed with reflected light or with transmitted light.

We claim:

1. An image processing apparatus for forming a visual image on a light-transmissive medium, said apparatus comprising:
   processing means for performing color correction processing and outputting a color image signal;
   means for generating a signal representative of a method of observing the light-transmissive medium; and
   means for controlling said processing means in accordance with said signal representative of the method of observing the light-transmissive medium, wherein the signal representative of the observation method is a signal indicating whether the light-transmissive medium is to be observed with reflected light or with transmitted light.

2. An image processing apparatus according to claim 1, wherein said processing means is a color masking circuit.

3. An image processing apparatus according to claim 1, wherein said processing means is an under color processing circuit.

4. An image processing apparatus according to claim 1, further comprising means for forming a visual image corresponding to the color image signal output by said processing means on the light-transmissive medium.

5. An image processing apparatus according to claim 4, wherein said forming means is an ink jet printer.

6. An image recording apparatus comprising:
   input means for inputting an image signal;
   correction means for correcting said inputted image signal;
   image forming means for forming an image in accordance with said image signal corrected by said correction means on a light-transmissive medium;
   means for generating a signal indicating a method of observing the light-transmissive medium on which the image is formed by said image forming means; and
   control means for controlling said correction means in accordance with the signal generated by the signal generating means, wherein the signal representative of the observation method is a signal indicating whether the light-transmissive medium is to be observed with reflected light or with transmitted light.

7. An image recording apparatus according to claim 6, wherein the image signal is a color image signal, and said correction means is color correction means.

8. An image recording apparatus according to claim 7, wherein said color correction means performs color correction b using a predetermined masking coefficient.

9. An image recording apparatus according to claim 8, wherein said control means controls said correction means by changing the masking coefficient.

10. An image recording apparatus according to claim 6, wherein said image forming means forms an image by an ink jet recording.

11. An image recording apparatus according to claim 7, wherein said image forming means forms an image by an ink jet recording.

12. An image recording apparatus comprising:
input means for inputting an image signal;
correction means for correcting said inputted image signal;
image forming means for forming an image in accordance with said image signal corrected by said correction means on a light-transmissive medium;
means for generating a signal indicating a method of observing the light-transmissive medium on which the image is formed by said image forming means; and
control means for controlling said correction means in accordance with the signal generated by the signal generating means, wherein the light-transmissive medium includes a transparent layer as a first surface and an ink absorbing layer as a second surface, and wherein an image is formed on said ink absorbing layer.

13. An image recording apparatus according to claim 6, wherein the signal representative of the observation method is a signal indicating the type of light source for illuminating the image formed by said image forming means.

14. An image recoding apparatus according to claim 12, wherein the image signal is a color image signal, and said correction means is color correction means.

15. An image recording apparatus according to claim 14, wherein said color correction means performs color correction by using a predetermined masking coefficient.

16. An image recording apparatus according to claim 15, wherein said control means controls said correction means by changing the masking coefficient.

17. An image recording apparatus according to claim 12, wherein said image forming means forms an image by ink jet recording.

18. An image recording apparatus according to claim 14, wherein said image forming means forms an image by ink jet recording.

19. An image processing apparatus for forming a visual image on a light-transmissive medium, said apparatus comprising:
processing means for per forming color correction processing and outputting a color image signal;
means for generating a signal representative of a method of observing the light-transmissive medium; and
means for controlling said processing means in accordance with said signal representative of the method of observing the light-transmissive medium, wherein the light-transmissive medium includes a transparent layer as a first surface and an ink absorbing layer as a second surface, and wherein an image is formed on said ink absorbing layer.

20. An image processing apparatus according to claim 19, wherein said processing means is a color masking circuit.

21. An image processing apparatus according to claim 19, wherein said processing means is an under color processing circuit.

22. An image processing apparatus according to claim 19, further comprising means for reproducing a color image signal processed by said processing means as a visual image.

23. An image processing apparatus according to claim 22, wherein said reproducing means is an ink jet printer.

24. An image processing apparatus for forming a visual image on a light-transmissive medium, said apparatus comprising:
processing means for performing color correction processing and outputting a color image signal;
means for generating a signal representative of a method of observing the light-transmissive medium; and
means for controlling said processing means in accordance with said signal representative of the method of observing the light-transmissive medium, wherein the signal representative of the observation method is a signal indicating the type of light source for illuminating the image formed by said image forming means.

25. An image processing apparatus according to claim 24, wherein said processing means is a color masking circuit.

26. An image processing apparatus according to claim 24, wherein said processing means is an under color processing circuit.

27. An image processing apparatus according to claim 24, further comprising means for reproducing a color image signal processed by said processing means as a visual image.

28. An image processing apparatus according to claim 27, wherein said reproducing means is an ink jet printer.

29. An image recording apparatus:
input means for inputting an image signal;
correction means for correcting said inputted image signal;
image forming means for forming an image in accordance with said image signal corrected by said correction means on a light-transmissive medium;
means fore generating a signal indicating a method of observing the light-transmissive medium on which the image is formed by said image forming means; and
control means for controlling said correction means in accordance with the signal generated by the signal generating means, wherein the signal representative of the observation method is a signal indicating the type of light source for illuminating the image formed by said image forming means.

30. An image recording apparatus according to claim 29, wherein the image signal is a color image signal, and said correction means is color correction means.

31. An image recording apparatus according to claim 30, wherein said color correction means performs color correction by using a predetermined masking coefficient.

32. An image recording apparatus according to claim 31, wherein said control means controls said correction means by changing the masking coefficient.

33. An image recording apparatus according to claim 29, wherein said image forming means forms an image by ink jet recording.

34. An image recording apparatus according to claim 30, wherein said image forming means forms an image by ink jet recording.

35. An image processing apparatus comprising:
processing means for processing a received image signal to reproduce on a medium a visible image for observation according to the received image signal;
generation means for generating an indication signal indicating a kind of light source with which the medium is to be illuminated for observation; and
control means for controlling said processing means according to the indicating signal.

36. An apparatus according to claim 35, wherein the kind of light source includes a fluorescent light source.

37. An apparatus according to claim 35, wherein the kind of light source includes an incandescent light source.

38. An apparatus according to claim 35, wherein the kind of light source includes a halogen lamp.

39. An apparatus according to claim 35, wherein the received image signal is a color image signal, and said processing means is a color masking processing means.

40. An apparatus according to claim 39, wherein said processing means controls a color masking parameter according to the indicating signal.

41. An apparatus according to claim 35, further comprising reproducing means for reproducing on the medium an image according to the image signal processed by said processing means.

42. An apparatus according to claim 41, wherein said reproducing means comprises an ink jet recording device.

43. An image processing method for forming a visual image on a light-transmissive medium, said method comprising the steps of:
performing color correction processing of an input signal;
outputting a color image signal;
generating a signal representative of a method of observing the light-transmissive medium; and
controlling said color correction processing step in accordance with the signal representative of the method of observing the light-transmissive medium generated in the signal generating step, wherein the signal representative of the observation method is a signal indicating whether the light-transmissive medium is to be observed with reflected light or with transmitted light.

44. An image processing method according to claim 43, wherein said color correction processing step includes color masking.

45. An image processing method according to claim 43, wherein said color correction processing step includes under color processing.

46. An image processing method according to claim 43, further comprising the step of forming a visual image corresponding to the color image signal output in said outputting step on the light-transmissive medium.

47. An image processing method according to claim 46, wherein said image forming step utilizes ink jet printing.

48. An image processing method according to claim 43, wherein the light-transmissive medium includes a transparent layer as a first surface and an ink absorbing layer as a second surface, and wherein an image is formed on said ink absorbing layer.

49. An image recording method comprising the steps of:
inputting an image signal;
correcting the inputted image signal;
forming an image in accordance with the image signal corrected in said correction step on a light-transmissive medium;
generating a signal indicating a method of observing the light-transmissive medium on which the image is formed in said image forming step; and
controlling the correction of the image signal in accordance with the signal generated in said signal generating step, wherein the signal representative of the observation method is a signal indicating whether the light-transmissive medium is to be observed with reflected light or with transmitted light.

50. An image recording method according to claim 49, wherein the inputted image signal is a color image signal, and said correction step is color correction step.

51. An image recording method according to claim 50, wherein in said color correction step, color correction is performed by using a predetermined masking coefficient.

52. An image recording method according to claim 51, wherein in said controlling step, the masking coefficient in said correction step is changed.

53. An image recording method according to claim 49, wherein said image forming step utilizes ink jet recording.

54. An image recording method according to claim 50, wherein said image forming step utilizes ink jet recording.

55. An image recording method according to claim 49, wherein the light-transmissive medium includes a transparent layer as a first surface and an ink absorbing layer as a second surface, and wherein in said image forming step an image is formed on the ink absorbing layer.

56. An image recording method according to claim 49, wherein the signal representative of the observation method is a signal indicating the type of light source for illuminating the image formed in said image forming step.

57. An image processing method for reproducing on a medium a visible image for observation, said method comprising the steps of:
receiving an image signal;
generating an indicating signal indicating the kind of light source with which the medium is to be illuminated for observation; and
controlling processing of the image signal according to the indicating signal.

58. A method according to claim 57, wherein the kink of light source includes a fluorescent light source.

59. A method according to claim 57, wherein the kind of light source includes an incandescent light source.

60. A method according to claim 57, wherein the kind of light source includes a halogen lamp.

61. A method according to claim 57, wherein the image signal is a color image signal, and said controlling processing step includes color masking.

62. A method according to claim 61, wherein said controlling processing step includes controlling a parameter of the color masking according to the indicating signal.

63. A method according to claim 57, further comprising the step of forming on the medium an image according to the processed image signal.

64. A method according to claim 63, wherein the step of image formation is conducted by an ink jet recording device.

* * * * *